Nov. 9, 1948.                K. SCHLEGEL                2,453,599
              DOUGH PREPARING DEVICE FOR LATTICEWORK PIE CRUST
Filed Feb. 21, 1947                              2 Sheets-Sheet 1
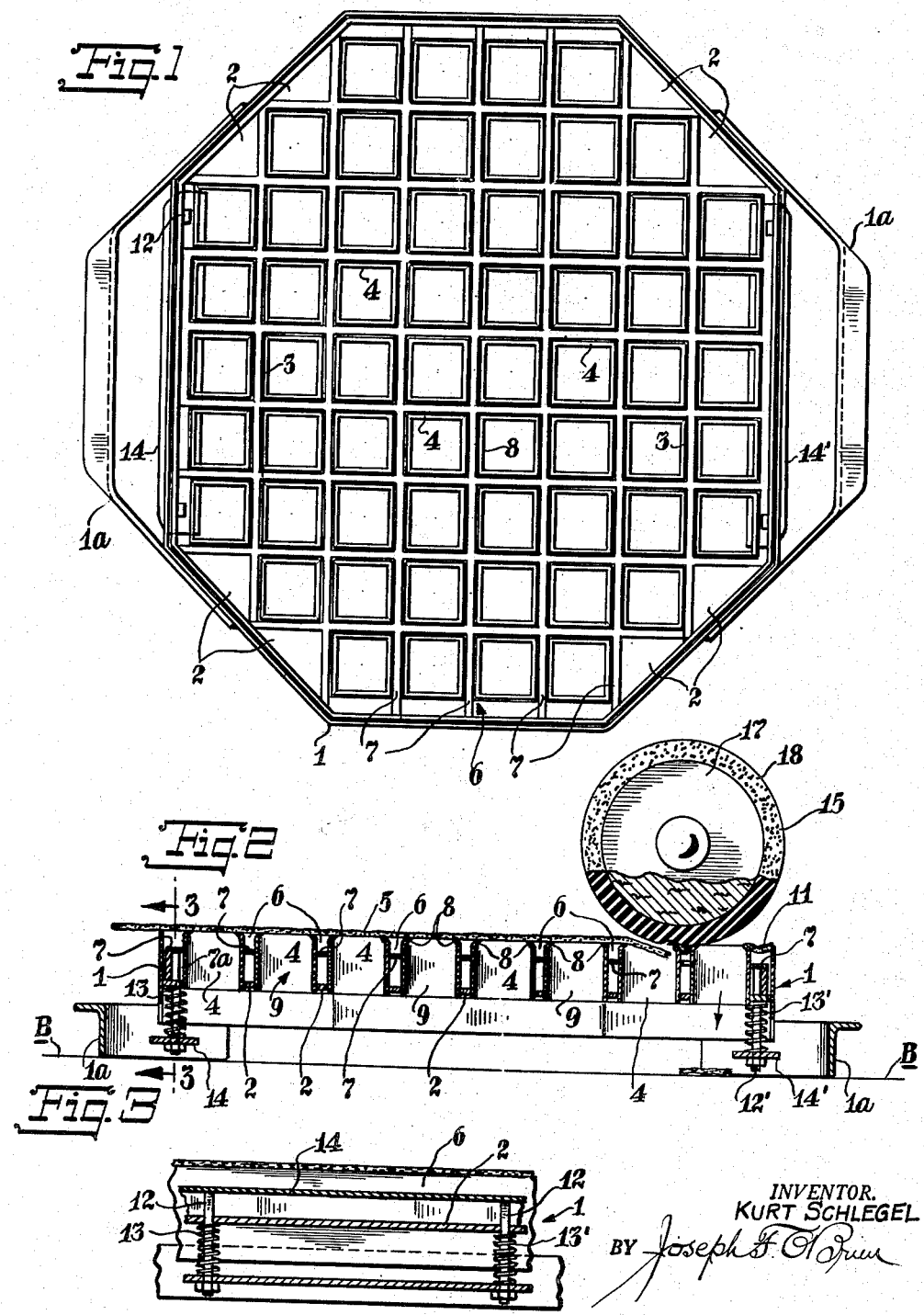
INVENTOR.
KURT SCHLEGEL
BY Joseph F. O'Brien
ATTORNEY

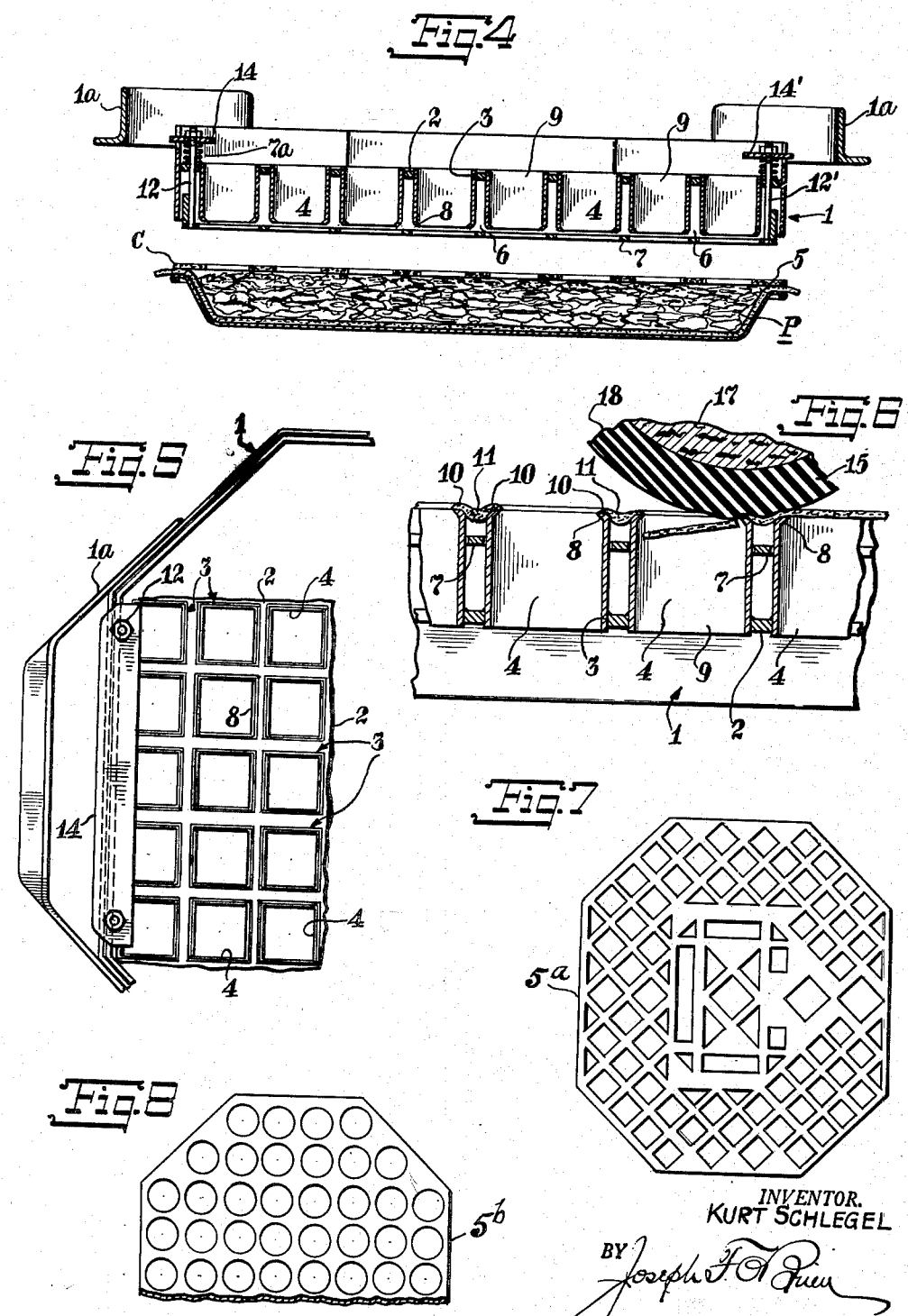

Patented Nov. 9, 1948

2,453,599

UNITED STATES PATENT OFFICE 2,453,599

DOUGH-PREPARING DEVICE FOR LATTICE-WORK PIE CRUSTS

Kurt Schlegel, New York, N. Y.

Application February 21, 1947, Serial No. 730,051

5 Claims. (Cl. 107—47)

This invention relates to dough-preparing devices for lattice-work pie crusts.

Lattice-work or openwork pie-crusts are desirable because they are economical of dough employed, save time in baking and give the pie a better appearance. Such crusts are usually formed by cutting sheets of pie-crust dough of suitable thickness into strips of the required length, crossing or interlacing the strips on the pie to produce overlapping portions of double-thickness at the joints and then subjecting the pie to the baking process, and it has also heretofore been proposed to lay a sheet of dough on a flat rolling and thinning surface and by the use of a cutter or die to stamp out sections or pieces therefrom so as to produce an openwork pie-crust-blank which was then lifted and applied to a pie-body and baked.

In accordance with my invention, I provide a dough-preparing device embodying, in combination, a multiplex series of tubular dies of such design or configuration as to cut from a sheet of dough suitable perforations or apertures, said dies being positioned in spaced relationship to each other to enable formation between such perforations of lattice strips of an openwork pie-crust, said group of dies being supported, preferably by a base plate, in such properly spaced relationship to each other and with their cutting edges projecting upwardly to a common level to provide a dough sheet supporting platform (capable of receiving and initially supporting a thin plate, sheet or layer of superimposed pie-crust dough) and having between the edges of the walls of such dies openwork or lattice-like inter-die channels to permit embedding of dough from said plate, sheet or layer for said lattice strips, each of said dies having cutting edges inclined or curved inwardly toward the axis of the die to produce at the outer sides of said die-cutting-edges outwardly inclined channel walls engageable with and providing increased engaging surface to retain therein the lattice strips of dough, and also to enable complete severance of severed dough pieces and a downward dropping thereof within the walls of the tubular die which is preferably open at its bottom portion to permit dropping of said severed pieces on a suitable support or table.

Another object of my invention is to mount within said inter-die channels an ejecting plate having perforations fitting around said dies and having ejecting strips movable within said channels to engage and eject from such channels the embedded lattice-like dough-strips, and in the preferred embodiment of my invention, said ejecting plate is adapted to cooperate with said device, upon inversion and manipulation to permit the ejection of such strips from the aforesaid channels and the dropping and accurate positioning thereof upon a pie.

Another object of my invention is to utilize, in combination with an ejecting plate of the type hereinabove specified, mounting means including suitable springs for movably and resiliently retaining said ejecting plate within said channels, and manually-operable handles connected with said mounting means for causing, upon manual pressure on said handles against the action of said springs, the outward movement of such ejecting plate and the ejection of the prepared openwork plate of dough from said channels.

Another object of my invention is to provide in a device of the character specified a dough rolling device having a soft rolling surface to press a sheet of dough downwardly against the cutting edges of the multiplex group of dies and to permit embedding of the cutting edges within the soft surface of the roller beyond the line of severance of the dough pieces to produce a clean cutting of pieces by the dies and an embedding of a perforated plate of dough in the adjacent lattice-like channels.

Another object of my invention is to provide a frame and base plate arranged to hold said die group in elevated position above a suitable support.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a view in plan of my dough-preparing device having my dough-sheet receiving platform composed of die cutting edges positioned uppermost for receiving and initially supporting and subsequently cutting a sheet of pie-crust dough thereon;

Fig. 2 is a section on the line 2—2 of Fig. 1 looking in the direction of the arrows and showing a sheet of dough supported on the dough-receiving platform and in the process of being cut by the passage thereover of a soft-surfaced rubber roller;

Fig. 3 is a section on the line 3—3 of Fig. 2 looking in the direction of the arrows and showing means for mounting my manually operable ejection plate and the handles for operating the same;

Fig. 4 is a sectional view substantially on the line 2—2 of Fig. 1 showing the device inverted and ejection plate lowered against the action of the springs to cause the perforate plate of pie-crust to be dropped in proper relationship upon a prepared pie in a suitable dish;

Fig. 5 is a fragmentary view in plan of the bottom surface of the device showing the frame, base plate and bottom portions of the dies of my said dough-preparing device;

Fig. 6 is an enlarged fragmentary section substantially on the line 2—2 of Fig. 1 showing more clearly the shape and positioning of the die edges and dough-embedding channels; and Figs. 7 and 8 are plan views showing two of many designs of pie-crusts capable of being produced by devices of the type specified.

Referring now to these drawings which illustrate a preferred embodiment of my invention, 1 indicates a suitable perimetric frame which, in the preferred form of my invention shown, is octagonal in conformation and has enclosed therein a base plate 2 preferably composed of aluminum or other relatively soft metal and provided with a series of apertures 3 in which are supported a multiplex series of tubular dies 4, each of which is in the shape of the design desired for the pie-crust. As illustrated, the dies are of suitable height or length and are supported intermediate their ends by said base plate 2, said dies being seated within and securely fastened to the edges of the apertures 3 and having the cutting edges thereof projecting upwardly. All of these dies 4 are preferably of a given height and are so supported as to produce at the top surface a flat platform capable of receiving and initially supporting a thin sheet or layer 5 of superimposed pie-crust dough. Said series of multiplex upwardly projecting dough-cutting dies 4 are so supported in properly spaced relationship to each other to provide between such dies a group of lattice-like inter-die channels 6 positioned above the supporting base plate 2, which channels are utilized to house a perforated ejecting plate 7 and also to provide at the upper edges thereof an embedding portion for the lattice strips of the perforated pie-crust plate of dough 5.

In accordance with my invention, the upper cutting edges of the dies 4 are, as aforesaid, aligned horizontally to provide a dough-sheet supporting platform and are formed at their upper edges with inwardly inclined cutting edges 8. These edges are inwardly inclined or bevelled for the purpose of enabling pieces of dough when cut thereby to drop freely downwardly through the die as illustrated in Figs. 2 and 6 without contacting with or sticking to the walls thereof, and all of these dies are preferably open at their bottoms as shown at 9 so that the severed pieces will drop from the cutting edges 8 directly down upon a bench B or other suitable support for the dough-preparing device. The dies are also preferably held in elevated position above the bench or support B by the perimetric frame 1 and a handle-frame 1ᵃ as more particularly hereinafter specified.

The inwardly inclined edges 8 also produce at the opposite sides thereof bevelled channel walls 10 (see Fig. 6) which provide greater retaining surfaces for the lattice-work strips 11 of the dough-plate being prepared. In preparing a lattice-work pie crust on my device, a sheet, plate or layer of dough 5 is rolled out to suitable thickness and then flipped over or otherwise suitably superimposed upon the upper cutting surfaces of the tubular dies 4.

The ejecting plate 7 has strips and openings corresponding to the channels and surrounding the dies of the device, and is mounted to cause the die-severed strips 11 to be seated within the various channels 6.

The ejecting plates are resiliently mounted within the channels 6 between the ends thereof to permit an outward or downward movement thereof to and slightly beyond the mouths of the channels 6 to eject embedded dough strips from such channels. For this purpose, the opposite side edges of said ejecting plate 7 are provided with operating handles 14, 14' and, as shown, have spacing members 7ᵃ extending into contact with the supporting base plate 2 and also have connected thereto pairs of plunger rods 12, 12' which pass through openings in the base plate 2, and have mounted thereon pairs of spiral springs 13, 13' arranged between said base plates and the operating plates or handles 14, 14' so as to resiliently hold the ejection plate and its strips in normally inoperative position within the channels 6. As illustrated, the auxiliary frame members 1ᵃ comprise segmental members fastened to the main frame 1 and are positioned adjacent to the operating handles 14, 14' so as to serve as elevated rests for the operating handles 14, 14' and also as side stationary carrying handles for the entire dough-preparing device.

When a sheet of dough is superimposed, as above described, upon the said platform formed by the cutting edges of the dies, any suitable soft means may be used for pressing the plate of dough through the dies, but in the preferred form of my invention I utilize a roller 15 provided with a hard core 17 and a soft rubber surface 18 adapted to permit the cutting edges of the dies 4 to embed themselves into the surface of the soft rubber 18 and thus to completely cut the dough plate 5 during a rolling movement of the roller over said cutting edges of the dies 4.

It will be seen that the inwardly inclined cutting edges will provide an inward or axial overhang adapted, when a section of dough is cut by the die, to cause the same to drop freely down through the die without contact with the walls thereof, and these inwardly overhanging or bevelled cutting edges provide at the opposite sides thereof, dough-contacting surfaces at the sides of the channels to permit the dough between such apertures to be embedded and held at the top of said channels, thus providing a wider channel and a dough strip having bevelled edges, and these bevel-edged channels will, because of the increased contact thereof, hold and retain by frictional engagement the dough strip from dropping or moving downwardly into the channel. The bevel-channel portions also shape the strips of dough to cause the same to have a cross-sectional shape of semi-spherical conformation. When the roller 15 has passed over the entire device and completed its function of cutting the sections and embedding dough within the channels, the said roller 15 is removed and the device with the latticed plate of dough embedded in the channels is inverted and placed over a pie P, and, as shown in Fig. 4, the ejecting plate 7 is lowered by manual pressure on the handles 14, 14' against the action of the pairs of springs 13, 13', whereupon the plate of pie-crust dough 5 will accurately register with the body of the pie P and will be superimposed thereon ready for baking.

In Figs. 1 to 6 I have shown dies 4 adapted to cut out square sections and to provide lattice-work strips 11 arranged in rectangular relationship to each other, but it will be understood that such dies may be made in any suitable shape or conformation which corresponds to the design of the pie-crust that it is desired to produce, and in Fig. 7 I have shown a pie-crust with rectangular dies in a different position, and with a suitable letter design provided in the center thereof, while in Fig. 8 I have shown a design in which the severed pieces are circular in conformation.

Having described my invention, I claim:

1. A dough-preparing device for lattice-work pie-crust embodying, in combination, a multiplex group of tubular dough-cutting dies adapted to perforate a sheet of pie-crust dough and having cutting edges extending to a common level to simultaneously cut a group of apertures of suitable design, the members of said group being positioned in closely spaced relationship to each other to provide inter-die channels for the formation between said perforations of open-work lattice strips of said perforated sheet, means for supporting said group of dies in said spaced group position, each of said dies having adjacent to the cutting edges wall portions inclined-inwardly toward the axis of the die to enable complete severence of dough pieces from the sheet and also to produce at the outer sides of said cutting edges outwardly-inclined channel walls engageable with and providing increased engaging surface between the channels and lattice strips to enable retention of such strips therein, and ejecting means movable within said channel to eject said perforated sheet of pie-crust dough from said channels.

2. A dough-preparing device for lattice-work pie-crust as claimed in claim 1 in which the ejecting means comprises a metallic plate normally retained within the inter-die channels and movable manually to simultaneously engage all the strips of the sheet of dough and simultaneously to eject the same from the device.

3. A dough-preparing device for lattice-work pie-crust embodying, in combination, a multiplex group of dough-cutting dies adapted to cut in a sheet of pie-crust dough a group of apertures of suitable design, members of said group being positioned in closely spaced relationship to each other to provide inter-die channels for the formation between said perforations of open-work lattice strips of said perforated sheet, a base plate for supporting said group of dies in a position having their cutting edges projecting upwardly to a common level to produce a platform capable of receiving and initially supporting a thin sheet of pie-crust dough, each of said dies having adjacent to said cutting edges wall portions inclined inwardly toward the axis of the die to enable complete severance of dough pieces from said sheet and also to cause a downward dropping within the walls of the said dies of such severed pieces and also to produce at the outer sides of said cutting edges outwardly inclined channel walls engageable with and providing increased engaging surface between the channels and lattice strips to enable retention of such strips therein, and ejecting means movable within said channel to eject said perforated sheet of pie-crust dough from said channels.

4. A dough-preparing device for lattice-work pie-crust embodying, in combination, a multiplex group of dough-cutting dies adapted to cut in a sheet of pie-crust dough a group of apertures of suitable design, members of said group being positioned in closely spaced relationship to each other to provide inter-die channels for the formation between said perforations of open-work lattice strips of said perforated sheet, a base plate for supporting said group of dies in a position having their cutting edges projecting upwardly to a common level to produce a platform capable of receiving and initially supporting a thin sheet of pie-crust dough, each of said dies having adjacent to said cutting edges wall portions inclined inwardly toward the axis of the die to enable complete severance of dough pieces from said sheet and also to cause a downward dropping within the walls of the said dies of such severed pieces and also to produce at the outer sides of said cutting edges outwardly inclined channel walls engageable with and providing increased engaging surface between the channels and lattice strips to enable retention of such strips therein, and ejecting means comprising a metallic plate normally retained within the inter-die channels and movable manually to simultaneously engage all the strips of the sheet of dough simultaneously to eject the same from the device, said ejecting plate having plunger rods connected thereto, a manually operable handle connected to said plunger rods and springs arranged intermediate said handle and said base plate to normally retain said ejecting plate in inoperative position.

5. A dough-preparing device for lattice-work pie-crust as claimed in claim 4 in which a frame member is provided to hold said multiplex group of dies in elevated position above a suitable support to permit the dropping of severed pieces on such support.

KURT SCHLEGEL.

REFERENCES CITED

The following references are of record in the file of this patent:

UNITED STATES PATENTS

| Number | Name | Date |
| --- | --- | --- |
| 29,295 | Marsh | July 24, 1860 |
| 1,098,552 | Bierer | June 2, 1914 |
| 1,660,552 | Green | Feb. 28, 1928 |
| 2,137,811 | Royal | Nov. 22, 1938 |
| 2,246,424 | Turner | June 17, 1941 |
| 2,345,045 | Harriss et al. | Mar. 28, 1944 |
| 2,405,661 | MacManus | Aug. 13, 1946 |
| 2,446,201 | Turner | Aug. 3, 1948 |

FOREIGN PATENTS

| Number | Country | Date |
| --- | --- | --- |
| 325,464 | Italy | Apr. 11, 1933 |